(12) United States Patent
Prabhakar et al.

(10) Patent No.: US 10,517,105 B1
(45) Date of Patent: Dec. 24, 2019

(54) ENHANCED LTE RETAINABILITY WHEN ROAMING

(71) Applicant: APPLE INC., Cupertino, CA (US)

(72) Inventors: Alosious Pradeep Prabhakar, Singapore (SG); Vijay Venkataraman, San Jose, CA (US); Yifan Zhu, San Jose, CA (US); Alistair M. McFarlane, London (GB); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/135,584

(22) Filed: Sep. 19, 2018

(51) Int. Cl.
| | |
|---|---|
| *H04W 4/00* | (2018.01) |
| *H04W 72/10* | (2009.01) |
| *H04W 76/15* | (2018.01) |
| *H04W 76/18* | (2018.01) |
| *H04W 36/00* | (2009.01) |
| *H04W 36/28* | (2009.01) |
| *H04M 15/00* | (2006.01) |
| *H04W 76/27* | (2018.01) |

(52) U.S. Cl.
CPC ....... *H04W 72/10* (2013.01); *H04W 36/0079* (2018.08); *H04W 36/28* (2013.01); *H04W 76/15* (2018.02); *H04W 76/18* (2018.02); *H04M 15/8038* (2013.01); *H04W 76/27* (2018.02)

(58) Field of Classification Search
CPC .................................................... H04W 48/18
See application file for complete search history.

(56) References Cited

U.S. PATENT DOCUMENTS

| | | | | |
|---|---|---|---|---|
| 7,702,329 | B1 * | 4/2010 | Durig | H04W 8/183 455/432.1 |
| 8,417,242 | B2 * | 4/2013 | Cormier | H04W 48/18 370/337 |
| 2015/0016323 | A1 * | 1/2015 | Sundararajan | H04W 52/0209 370/311 |
| 2017/0272925 | A1 * | 9/2017 | Rupanagudi Venkata | H04L 43/16 |
| 2017/0325144 | A1 * | 11/2017 | Raghunathan | H04W 36/16 |
| 2018/0324661 | A1 * | 11/2018 | Ryden | H04W 36/30 |

* cited by examiner

*Primary Examiner* — Shantell L Heiber
(74) *Attorney, Agent, or Firm* — Fay Kaplun & Marcin, LLP

(57) ABSTRACT

A device is configured to establish a first roaming network connection to a first roaming network and a second roaming network connection to a second roaming network. The first roaming network has a higher priority than the second roaming network, the second roaming network configured to support a first radio access technology (RAT) and a second RAT, the first RAT having a higher priority than the second RAT. When a current network connection is the second roaming network connection, determining a current RAT used for the second roaming network connection. When the current RAT is the first RAT, determining between an active use state and a non-active use state. When the device is in the active use state, deactivating a capability to reselect to the first roaming network.

24 Claims, 3 Drawing Sheets

ENHANCED LTE RETAINABILITY WHEN ROAMING

BACKGROUND INFORMATION

A user equipment (UE) may be configured to establish a connection to at least one of a plurality of different networks or types of networks to perform a variety of different functionalities via the connection. For example, the UE may connect to different types of networks (e.g., cellular network, WiFi network, etc.) to exchange data. In another example, the UE may connect to different network technology types (e.g., Long Term Evolution (LTE) network, legacy network, 5G network, etc.) to exchange data at different operating parameters associated with the network technology type. In a further example, the UE may be configured to connect to different regional networks such as a home network while not roaming or a visited network while roaming.

The UE may be associated with a carrier who provides cellular service while the UE is connected to a home network in a home country. The carrier may also have roaming agreements with one or more foreign carriers who provide cellular service in a foreign country. Thus, when the UE enters the foreign country, through the roaming agreement, the UE may enter a roaming state and establish a connection to a foreign network of a foreign carrier. While connected to the foreign network, the UE may utilize the available network technology types and exchange data.

When the carrier has a roaming agreement with multiple foreign carriers in the foreign country, the carrier may prioritize which foreign carrier is to be used by the UE when roaming in the foreign country when more than one foreign network associated with a respective foreign carrier is available. For example, the UE may be connected to a first foreign network that has a lower priority and then may detect a second foreign network that has a higher priority. Due to the prioritization, the UE may perform a handover to select the second foreign network. However, in instances when the connection to the first foreign network is actively being used, the handover may cause a negative user experience. For example, the UE may experience interruptions. In another example, the UE may connect to the second foreign network using a network technology type that is relatively worse than the network technology type used with the first foreign network.

SUMMARY

In one exemplary embodiment, a method is performed by a device that is configured to establish a first roaming network connection to a first roaming network and a second roaming network connection to a second roaming network, the first roaming network having a higher priority than the second roaming network, the second roaming network configured to support a first radio access technology (RAT) and a second RAT, the first RAT having a higher priority than the second RAT. The method includes when a current network connection is the second roaming network connection, determining a current RAT used for the second roaming network connection, when the current RAT is the first RAT, determining between an active use state and a non-active use state and when the device is in the active use state, deactivating a capability to reselect to the first roaming network.

In a further exemplary embodiment, a device having a transceiver and a processor are described. The transceiver is configured to establish a first roaming network connection to a first roaming network and a second roaming network connection to a second roaming network, the first roaming network having a higher priority than the second roaming network, the second roaming network configured to support a first radio access technology (RAT) and a second RAT, the first RAT having a higher priority than the second RAT. The processor is configured to, when a current network connection is the second roaming network connection, determine a current RAT used for the second roaming network connection, when the current RAT is the first RAT, the processor determines between an active use state and a non-active use state, when the device is in the active use state, the processor deactivates a capability to reselect to the first roaming network.

In a still further exemplary embodiment, an integrated circuit is described for use with a device that is configured to establish a first roaming network connection to a first roaming network and a second roaming network connection to a second roaming network, the first roaming network having a higher priority than the second roaming network, the second roaming network configured to support a first radio access technology (RAT) and a second RAT, the first RAT having a higher priority than the second RAT. The integrated circuit includes first circuitry configured to, when a current network connection is the second roaming network connection, determine a current RAT used for the second roaming network connection, second circuitry configured to, when the current RAT is the first RAT, determine between an active use state and a non-active use state and third circuitry configured to, when the device is in the active use state, deactivate a capability to reselect to the first roaming network.

DETAILED DESCRIPTION

Figure 1:
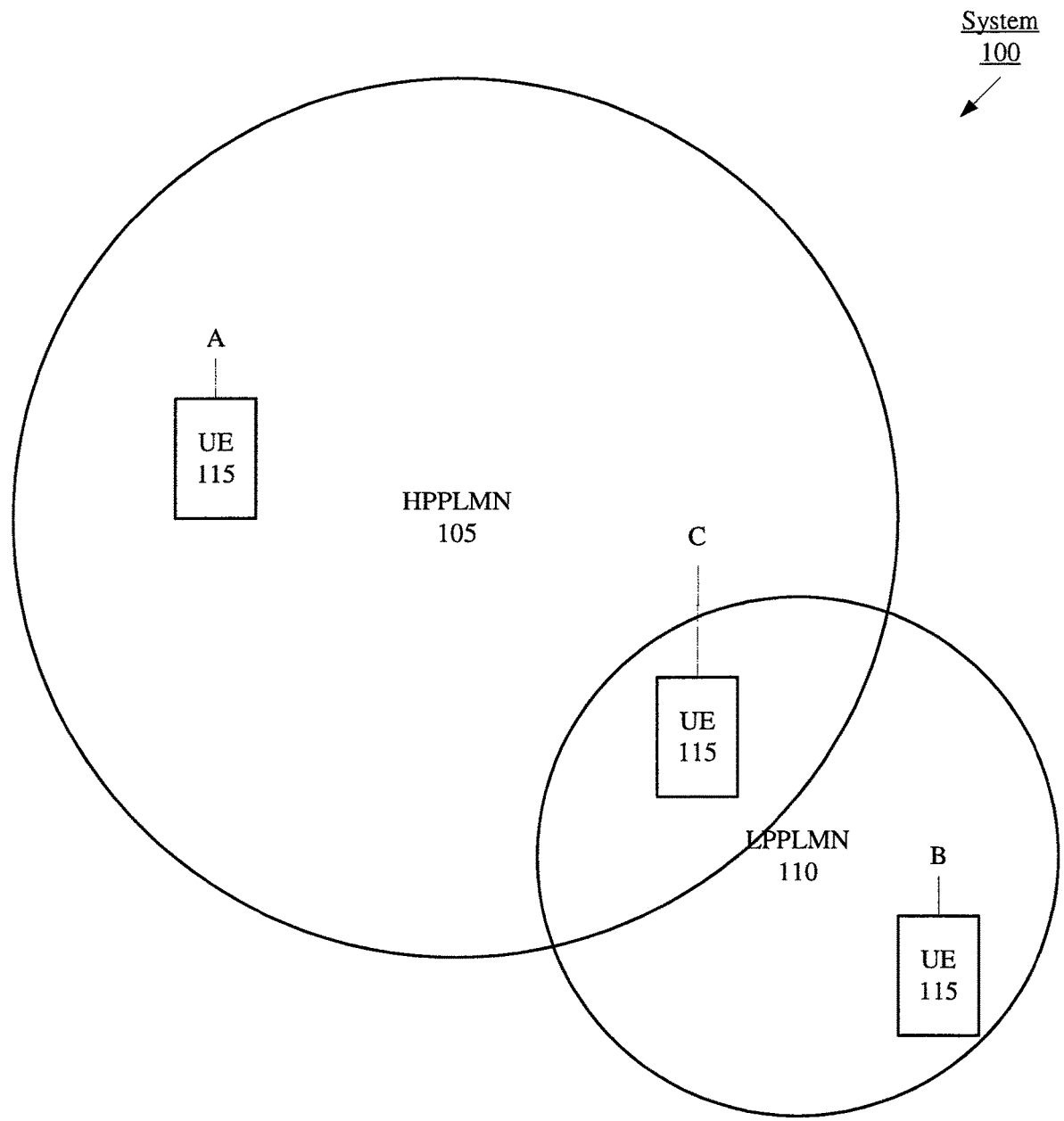
FIG. 1 shows an exemplary roaming system according to various exemplary embodiments described herein.

The exemplary embodiments may be further understood with reference to the following description and the related appended drawings, wherein like elements are provided with the same reference numerals. The exemplary embodiments are related to a device, system, and method for scenarios where a user equipment (UE) is roaming and a connection to a current network is retained when a higher priority network is available. The mechanism according to the exemplary embodiments may determine various conditions and states surrounding the UE to determine a manner in which to perform network operations associated with selecting a roaming network. As will be described in detail below, while the UE is connected to a lower priority roaming network using a selected network radio access technology type and while the UE is in use, the exemplary embodiments may retain this connection and prevent network operations to re-select to a higher priority roaming network.

Initially, it is noted that the exemplary embodiments are described with regard to a UE. However, the UE is only exemplary. The exemplary embodiments may be utilized with any device that may establish one or more connections as well as one or more types of connections (e.g., to a network, to a device, etc.) as well as be configured with the hardware, software, and/or firmware to establish one or more connections. Therefore, the UE as described herein is used to represent any device capable of establishing these connections.

It is also noted that the exemplary embodiments are described with regard to the UE roaming or attempting to connect to a network while outside a home country or home network. Subsequently, when more than one roaming network is available, the UE attempts to select and connect to a roaming network. However, the use of the roaming network is only exemplary. The exemplary embodiments may also be implemented for substantially similar scenarios in which the UE is outside the home network. If applicable, the exemplary embodiments may also be implemented for non-roaming scenarios. It is further noted that since the exemplary embodiments are directed to roaming scenarios, the exemplary embodiments are described with Public Land Mobile Networks (PLMNs). However, the PLMNs are only exemplary and the exemplary embodiments may be utilized for any network or connection.

A user associated with a UE may travel from one country to another. While in a home country, the UE may connect to a cellular network provided by a carrier with which the user has a subscription. When the user travels to a foreign country and brings the UE, the UE may also connect to a cellular network provided by a foreign carrier if the user's carrier has a roaming agreement with the foreign carrier. That is, a carrier in a first country may enter into a roaming agreement with one or more foreign carriers in respective foreign countries so that when a user subscribed to the carrier travels to a foreign country, the user may still enjoy connecting to a network of the foreign carrier to place calls and utilize data services. Specifically, the UE may enter a roaming state and connect to the foreign network to utilize this foreign network connection as defined in the subscription that the user entered with the carrier (e.g., applicable fees).

When the carrier enters into a roaming agreement in a selected foreign country with more than one foreign carrier, the carrier may maintain a priority table that defines for the UE which foreign carrier has the highest priority. Since the roaming agreement and the priority table may be relative to the carrier, the priority table may be stored in a subscriber identity module (SIM) card that is associated with the carrier. Through the SIM card, the priority table may be updated by the carrier over the air anytime that there is a change to be applied in the roaming priorities or agreements.

When a carrier enters into a roaming agreement with more than one foreign carrier, a UE in the foreign country in which these foreign carriers operate may enter scenarios where a reselection is prompted due to being connected to a lower priority foreign network and having detected a higher priority foreign network. The prioritization may be set such that the reselection operation takes precedence over any other consideration. Thus, in the above noted scenario, a user of the UE may be connected to a high throughput access technology on a lower priority foreign network but later experience a loss in service with a subsequent connection to a low throughput access technology when reselecting to a higher priority foreign network.

In a particular exemplary process to initially connect and subsequently reselect, a UE may be in a foreign country where the carrier has entered into a roaming agreement with two foreign carriers. The UE may be camped on a foreign network associated with a lower priority foreign carrier. For example, the UE may initially camp on a low throughput access technology and reselect to a high throughput access technology on the same foreign network. Thereafter, the UE may enjoy relatively good service with data exchanges being performed with a relatively high throughput. When the UE enters an idle state, the UE may hit a System Information Block (SIB) Read Failure (e.g., due to poor RF conditions). However, the currently camped bandwidth may be good coverage for the UE. After the SIB Read Failure, the UE may start a scan for networks to determine if a foreign network associated with a higher priority carrier is available. When found, the UE may drop to the low throughput access technology to get a Routing Area Update (RAU) REJECT from the lower priority foreign carrier. At this point, the UE may lose service for a moment. The UE may now transmit a Location Area Update (LAU) and RAU Request to the higher priority carrier. The UE may now camp to the foreign network associated with the higher priority carrier on the low throughput access technology and may reselect to the high throughput access technology after a time period (e.g., 50 seconds). This process may occur even during an active session while the user is using the UE. Therefore, during this entire exchange, the user may experience data stalls while the reselection process is being performed and low data speeds since the low throughput access technology is being used.

In view of above scenario, the exemplary embodiments provide a mechanism to dynamically modify the manner in which reselection operations are to be performed between networks and between access technologies within a network. The exemplary embodiments may consider the surrounding conditions and states of the UE as a basis for determining the manner in which to perform reselection operations. As will be described in further detail below, the exemplary embodiments provide a particular manner of preventing a reselection operation while the UE is connected to a foreign network associated with a lower priority carrier using a high throughput access technology when a network associated with a higher priority carrier may be available based on whether a user has an active session on the UE.

FIG. 1 shows an exemplary system 100 according to the exemplary embodiments. The system 100 may relate to when a UE 115 is in a foreign country outside a home network provided in a home country of a carrier to which a user of the UE 115 has subscribed. The foreign country may have a plurality of foreign carriers that provide respective foreign networks. As illustrated, in a general area of where the UE 115 is located, the system 100 may include two foreign networks to which the UE 115 may connect. The foreign networks may be implemented as PLMNs. For example, a first PLMN may be a high priority PLMN (HPPLMN) 105 and a second PLMN may be a low priority PLMN (LPPLMN) 110. In the general area illustrated in the system 100 of FIG. 1, the UE 115 may be located in a position A where the UE 115 is only within an operating area of the HPPLMN 105, a position B where the UE 115 is only within an operating area of LPPLMN 110, or a position C where the UE 115 is within an overlap zone for both the operating areas of the HPPLMN 105 and the LPPLMN 110. It should also be understood that there may be any number of foreign networks in the system 100 and the use of two foreign networks is only exemplary. However, for illustrative purposes, the exemplary embodiments are described with regard to two networks, the HPPLMN 105 and the LPPLMN 110. As will be described in further detail below, those skilled in the art will understand how the exemplary embodiments may be modified and/or implemented with more than two foreign networks.

The HPPLMN 105 and the LPPLMN 110 may be individual PLMNs that are operated by respective foreign carriers. The foreign carriers operating the HPPLMN 105 and the LPPLMN 110 may have a roaming agreement with a home carrier to which a user of the UE 115 is subscribed. It is again noted that the use of the foreign networks as PLMNs is only exemplary. As one skilled in the art will understand, the PLMN may be a network providing telecommunications services to the public. The HPPLMN 105 and the LPPLMN 110 may each be identified by a respective Mobile Country Code (MCC) and a respective Mobile Network Code (MNC). As illustrated, the HPPLMN 105 may have a first operating area while the LPPLMN 110 may have a second operating area. The operating areas have portions that are exclusively serviced by either the HPPLMN 105 or the LPPLMN 110. However, there may also be a zone where the operating areas of both the HPPLMN 105 and the LPPLMN 110 overlap such that services from both the HPPLMN 105 and the LPPLMN 110 are available to the UE 115.

It may be assumed that for the exemplary embodiments, the UE 115 of the system 100 in the foreign country is in a roaming state. That is, the user has not replaced a subscriber identity module (SIM) card associated with the home carrier in the home country with a temporary SIM card to be used while in the foreign country. By retaining the SIM card associated with the home carrier and being in the foreign country, the UE 115 may enter the roaming state where the HPPLMN 105 and the LPPLMN 110 are roaming networks to which the UE 115 may be configured to connect in view of the roaming agreement that the home carrier has with the foreign carriers of the roaming networks.

The HPPLMN 105 and the LPPLMN 110 may be any type of network to which the UE 115 is configured to establish a connection. For example, the HPPLMN 105 and the LPPLMN 110 may be a cellular radio access network (RAN), a wireless local area network (WLAN) (e.g., a WiFi network), etc. In view of the different types of RANs, the UE 115 may be configured with the appropriate chipset (e.g., a cellular chipset, a WiFi chipset, etc.) to communicate with the respective RAN. The HPPLMN 105 and the LPPLMN 110 may also be configured to utilize different radio access technologies (RATs). For example, the HPPLMN 105 and the LPPLMN 110 may provide a cellular RAN using a 3G network, a WCDMA network, a UMTS network, a LTE network, a 5G network, etc. For illustrative purposes, the HPPLMN 105 and the LPPLMN 110 will each be described as a cellular network including a high throughput RAT and a low throughput RAT. For example, the high throughput RAT may be LTE while the low throughput RAT may be 3G. However, those skilled in the art will understand that the HPPLMN 105 and the LPPLMN 110 may be any type of RAN and utilize any number and types of RATs.

Figure 2:
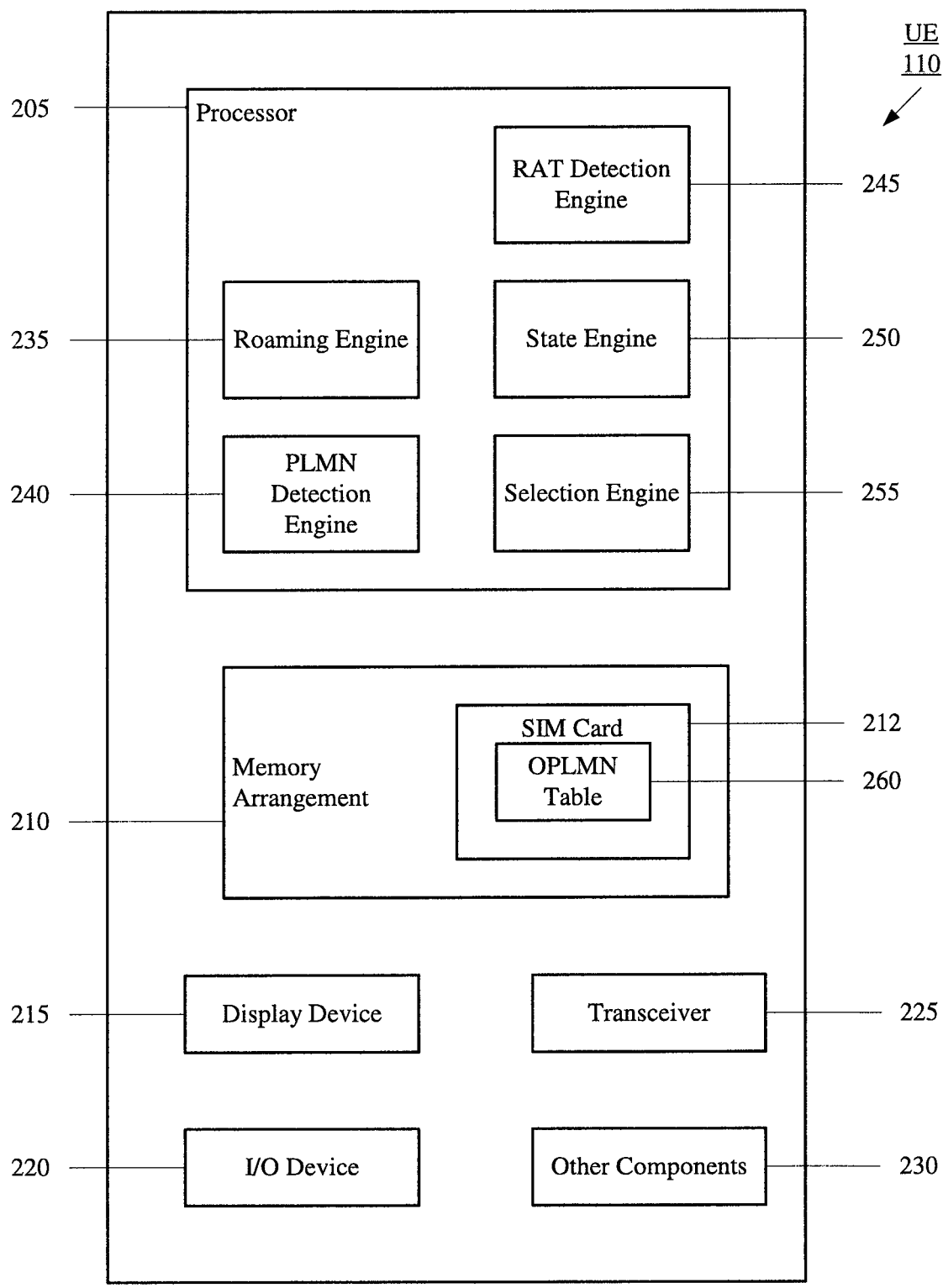
FIG. 2 shows an exemplary user equipment according to various exemplary embodiments described herein.

The exemplary embodiments relate to the UE 115 determining a manner to reselect a roaming network. Based on the conditions and states of the UE 115 at the time the determining is performed, the exemplary embodiments may indicate whether a particular operation is to be performed or deactivated. FIG. 2 shows the exemplary UE 115 of the system 100 of FIG. 1 according to the exemplary embodiments. The UE 115 is configured to execute a plurality of engines that perform functionalities to determine a manner in which to perform network operations associated with selecting between the HPPLMN 105 and the LPPLMN 110 as well as the manner in which to select the RAT for the connected network.

The UE 115 may represent any electronic device that is configured to perform wireless functionalities. For example, the UE 115 may be any type of electronic component that is configured to communicate via a network, e.g., mobile phones, tablet computers, smartphones, phablets, embedded devices, wearable devices, Cat-M devices, Cat-Ml devices, MTC devices, eMTC devices, other types of Internet of Things (IoT) devices, etc. The UE 115 may include a processor 205, a memory arrangement 210, a display device 215, an input/output (I/O) device 220, a transceiver 225, and other components 230. The other components 230 may include, for example, sensors to detect movement and movement related data, an audio input device, an audio output device, a battery that provides a limited power supply, a data acquisition device, ports to electrically connect the UE 115 to other electronic devices, sensors to detect conditions of the UE 115, etc.

The processor 205 may be configured to execute a plurality of engines of the UE 115. For example, the engines may include a roaming engine 235, a PLMN detection engine 240, a RAT detection engine 245, a state engine 250, and a selection engine 255. The roaming engine 235 may be configured to determine when the UE 115 is in a roaming state. The PLMN detection engine 240 may be configured to determine available roaming networks at a location of the UE 115. The RAT detection engine 245 may be configured to determine available RATs on the roaming network to which the UE 115 is connected. The state engine 250 may be configured to determine a use state of the UE 115. The selection engine 255 may be configured to determine a manner in which network selection operations are performed.

It should be noted that the above noted engines each being an application (e.g., a program) executed by the processor 205 is only exemplary. The functionality associated with the engines may also be represented as a separate incorporated component of the UE 115 or may be a modular component coupled to the UE 115, e.g., an integrated circuit with or without firmware. For example, the integrated circuit may include input circuitry to receive signals and processing circuitry to process the signals and other information. The engines may also be embodied as one application or separate applications or as part of one or more multifunctional programs. Accordingly, the applications may be implemented in a variety of manners in hardware, software, firmware, or a combination thereof. In addition, in some UEs, the functionality described for the processor 205 is split among two or more processors such as a baseband processor and an applications processor, as will be described in further detail below. The exemplary embodiments may be implemented in any of these or other configurations of a UE.

The memory arrangement 210 may be one or more hardware components configured to store data related to operations performed by the UE 115. For example, the memory arrangement 210 may store data associated with network parameters that are measured and signals exchanged with networks. The memory arrangement 210 may also include a SIM card 212 configured to store subscriber related data. As will be described in further detail below, the SIM card 212 may store an operator PLMN (OPLMN) table 260. The OPLMN table may be a carrier controlled list of PLMNs with which the carrier has a roaming agreement in a respective foreign country. Thus, the OPLMN table may identify the available roaming networks to which the UE 115 may establish a roaming connection while the UE 115 is in the foreign country.

The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The transceiver 225 may be a hardware component configured to establish a network connection. For example, the transceiver 225 may be configured to establish a network connection to a home network provided by the carrier to which the user of the UE 115 has subscribed. As noted above, the exemplary embodiments are directed to when the UE 115 is in a foreign country. Thus, the transceiver 225 may also be configured to establish a roaming network connection to a roaming network (e.g., the HPPLMN 105 or the LPPLMN 110) provided by a foreign carrier with which the carrier to which the UE 115 is subscribed has a roaming agreement.

As described above, the exemplary embodiments are configured to determine a manner of utilizing network operations associated with selecting a network and/or a RAT while the UE 115 is in a roaming state. Using conventional mechanisms, network operations associated with selecting a network or a RAT while the UE 115 is roaming may entail prioritizing these network operations. Thus, when a current connection is to a lower priority roaming network (e.g., the LPPLMN 110), the conventional mechanism may force a reselection to a higher priority roaming network (e.g., the HPPLMN 105) when detected. In view of these network operations being prioritized, the connection may fluctuate and negatively impact a user experience. Therefore, the mechanism according to the exemplary embodiments may overcome scenarios where the UE 115 reselects a network even when the UE 115 is in an active use state in which the user is using the UE 115. Thus, the exemplary embodiments prevent a loss of service or a temporary degradation of service resulting from performing a reselection operation at an inopportune time for the user.

The roaming engine 235 may determine when the UE 115 is in a roaming state or a non-roaming state. For example, the roaming engine 235 may determine when the UE 115 may connect to a home network of the carrier to which the user of the UE 115 has a subscription and operate in a non-roaming state. Other times, when the home network is unavailable, the roaming engine 235 may indicate that the UE 115 is to operate in a roaming state. The roaming engine 235 may determine between the roaming state and the non-roaming state using a variety of methods. In a first example, the roaming engine 235 may have access to locations and geographic areas that the home network is available. Thus, a location determination that lies outside these areas may indicate that the roaming state is to be used. In a particular example, a country code from broadcast network signals may identify that the UE 115 is outside an area covered by the home network. In another example, the roaming engine 235 may receive signals exchanged by the transceiver 225 with networks that are available in the location of the UE 115. When the signals do not include signals broadcast from the home network, the roaming engine 235 may determine that the UE 115 is roaming and the roaming state is to be used. The roaming engine 235 may utilize any other mechanism that enables a determination between the roaming state and the non-roaming state.

When the roaming engine 235 indicates that the UE 115 is in the roaming state, the PLMN detection engine 240 may determine available roaming networks at a location of the UE 115. As described above, the foreign country or roaming area that the UE 115 has entered may have one or more roaming networks to which the UE 115 may be allowed to connect based on a roaming agreement of the home carrier. As noted above, the carrier may have a roaming agreement with two different foreign carriers in the foreign country that the UE 115 is located. As shown in the exemplary system 100, based on the specific location of the UE 115, the PLMN detection engine 240 may detect one or two roaming networks. For example, when the UE 115 is in position A, the PLMN detection engine 240 may detect the HPPLMN 105; when the UE 115 is in position B, the PLMN detection engine 240 may detect the LPPLMN 110; and when the UE 115 is in position C, the PLMN detection engine 240 may detect both the HPPLMN 105 and the LPPLMN 110. The PLMN detection engine 240 may detect available networks using any mechanism (e.g., receiving broadcast signals from networks). It is again noted that the use of two roaming networks is only exemplary and there may be more roaming networks to which the carrier has a roaming agreement. The exemplary embodiments may be modified accordingly to accommodate further roaming networks in its consideration of modifying network operations associated with selecting a network and a RAT.

The PLMN detection engine 240 may also determine whether the UE 115 is allowed to establish a connection to a detected roaming network. Specifically, the OPLMN table 260 stored in the SIM card 212 of the memory arrangement 210 may store this information. The OPLMN table 260 may indicate various countries in which roaming agreements may be in place for the home carrier. For each foreign country, the roaming networks may also be indicated. Thus, when the UE 115 is in a selected foreign country, the OPLMN table 260 may list the available roaming networks to which the UE 115 may establish a connection. Accordingly, when a network in the foreign country is detected, the identity of the network may be compared to the list of available roaming networks to determine whether a connection may be established.

The OPLMN table 260 may also indicate a priority of the roaming networks. For example, the foreign country in which the UE 115 is located may be allowed to connect to the HPPLMN 105 and the LPPLMN 110. The OPLMN table 260 may indicate that the HPPLMN 105 has a higher priority than the LPPLMN 110. Thus, based purely on this priority, when the UE 115 is connected to the LPPLMN 110, the UE 115 may perform network operations to reselect the HPPLMN 115, if available.

The PLMN detection engine 240 may also be configured with a scan timer to periodically scan for available roaming networks. Thus, upon expiry of the scan timer, the PLMN detection engine 240 may use a listening mode of the transceiver 225 for a period of time to receive a network identifier that has been broadcast. It is noted that the exemplary embodiments may utilize a plurality of scan timers for each roaming network that is available in the foreign country as indicated in the OPLMN table 260. Thus, a first scan timer may be for the HPPLMN 105 and a second scan timer may be for the LPPLMN 110. In this manner, individual scan timers may allow for more aggressive or more passive searches to detect whether a roaming network is available. The PLMN detection engine 240 may utilize the scan timer to indicate to the transceiver 225 whether to be in a listening mode.

When the UE 115 has established a connection to a roaming network (e.g., the HPPLMN 105 or the LPPLMN 110), the RAT detection engine 245 may determine available RATs on the roaming network to which the UE 115 is connected. Specifically, the RAT detection engine 245 may determine a currently used RAT as well as other RATs that may be provided by the roaming network. As described above, the roaming network may be configured to provide different RATs and access the network based on operating parameters of the respective RAT. The capability to connect to a roaming network may also be defined by the roaming agreement. For example, a first roaming network may provide a 3G RAT and a LTE RAT. The roaming agreement with the first roaming network may allow for both the 3G RAT and the LTE RAT to be used. In another example, a second roaming network may also provide a 3G RAT and a LTE RAT. However, the roaming agreement with the second roaming network may only allow for the 3G RAT to be used. Thus, given the available RATs and the current RAT as indicated in the OPLMN table 260, the RAT detection engine 245 may determine whether another RAT option (e.g., a higher throughput RAT) may be used.

The state engine 250 may determine a use state of the UE 115. The use state may relate to whether the UE 115 is actively being used by the user. The state engine 250 may determine the use state based on a variety of factors. In a first example, the state engine 250 may determine whether the display device 215 is currently activated. The display device 215 being activated may indicate that the user is viewing the display device 215 and actively using the UE 115. In a second example, the state engine 250 may determine whether the I/O device 220 is being used to enter inputs. When inputs are being entered, the state engine 250 may determine that the user is actively using the UE 115. In a third example, the state engine 250 may determine whether any foreground applications are running. For example, a video streaming application that is running may indicate that the user is viewing the display device 215 and actively using the UE 115.

Although the state engine 250 may determine a general use state of the UE 115, since the exemplary embodiments are directed to determining a manner of performing network operations associated with network selection and RAT selection, the state engine 250 may filter the various uses of the UE 115 to determine the use state that also uses the network connection. Thus, the use state may relate to the active use of the UE 115 that involves the current network connection. Accordingly, the factors on which the use state is determined may be refined. In a first example, the state engine 250 may determine a state of the transceiver 225. When the state of the transceiver 225 is in a connected mode or a non-idle state, the state engine 250 may determine the UE 115 is in an active use state. In a second example, the state engine 250 may determine whether the use of the display device 215 or execution of an application involves the network connection. For example, when the display device 215 is activated and a video application is being executed to show a video on the display device 215, the state engine 250 may determine how the video is being accessed. If the video is accessed from the memory arrangement 210, the state engine 250 may determine that the UE 115 may be in use but not in the manner related to the mechanism according to the exemplary embodiments (e.g., the network connection is not currently being used to fetch the video). If the video is accessed by a streaming service through the network connection, the state engine 250 may determine that the UE 115 may be in use and in the manner related to the mechanism according to the exemplary embodiments. In this manner, the state engine 250 may determine the use state of the UE 115 as well as whether an active use state affects the mechanism according to the exemplary embodiments (as will be described below). It is noted that the network connection being used in a background capacity may not qualify identifying the UE 115 to be in the active use state.

The selection engine 255 may determine a manner in which network operations associated with selecting a network and a RAT are performed. Specifically, based on the outputs of the roaming engine 235, the PLMN detection engine 240, the RAT detection engine 245, the state engine 250, and the OPLMN table 260, the selection engine 255 may determine the conditions and states of the UE 115. Based on the conditions and states of the UE 115, the selection engine 255 may determine the network operations associated with selecting a network and a RAT to be performed and how they are to be performed. For example, there may be a plurality of network operations associated with selecting a network and a RAT. The network operations may include scanning for roaming networks, selecting a roaming network, performing association operations to connect to a selected roaming network, selecting a RAT on the roaming network, upgrading the RAT, etc. The selection engine 255 may be configured to dynamically select which of these network operations are to be performed or deactivated based on the conditions and states of the UE 115.

The mechanisms according to the exemplary embodiments may determine the conditions and states of the UE 115 to determine the manner of using network operations associated with selecting a network and a RAT. In describing the conditions and states of the UE 115, the outputs of the engines 235-250 will be described as these outputs are used by the selection engine 255. As will become apparent below, based on the system 100 including the HPPLMN 105 and the LPPLMN 110 with each of these roaming networks configured to provide a 3G RAT and a LTE RAT that may be used by the UE 115, there may be various scenarios that may arise at the time the mechanism according to the exemplary embodiments is used. In a first example, the UE 115 may be in position A, B, or C. In a second example, the UE 115 may be connected using the 3G RAT or the LTE RAT. In a third example, the UE 115 may be in active use. The mechanisms according to the exemplary embodiments may address each scenario having a combination of the above factors.

In a first consideration, the output of the roaming engine 235 may indicate whether the UE 115 is in a roaming state or a non-roaming state. When the UE 115 is in a non-roaming state, the UE 115 may establish a connection to a home PLMN and proceed accordingly. However, when the UE 115 is in a roaming state, the UE 115 may be configured to utilize network and RAT reselection network operations including use of the mechanisms according to the exemplary embodiments.

In a second consideration, the output of the PLMN detection engine 240 may indicate the available roaming networks. When the UE 115 is in a foreign country with no carrier in roaming agreements, the PLMN detection engine 240 may indicate that the UE 115 in the roaming state may not trigger the network and RAT reselection network operations because no network connections are established. However, if at least one foreign carrier has an active roaming agreement, the PLMN detection engine 240 may continue use of the network and RAT reselection network operations including the mechanisms according to the exemplary embodiments.

In the second consideration, the PLMN detection engine 240 may also identify the roaming network to which the UE 115 is currently connected. For example, while in position C, the UE 115 may be connected to the HPPLMN 105 while the LPPLMN 110 may also be available or vice versa. Based on the priorities of the available roaming networks as defined in the OPLMN table 260, the identification of a currently connected roaming network may indicate that the network and RAT reselection network operations may be used. For example, a connection to the HPPLMN 105 may indicate that the network reselection network operation is not to be used as the highest priority roaming network is already selected. In another example, a connection to the LPPLMN 110 may indicate that the network reselection network operation is to be used as a higher priority roaming network is available. Whether a conventional approach for these network operations is to be used or the mechanisms according to the exemplary embodiments are to be used may be determined based on further considerations.

In a third consideration, the output of the RAT detection engine 245 may indicate the available RATs on the roaming network to which a connection is established. When the OPLMN table 260 indicates that only one RAT for a roaming network is available, the RAT detection engine 245 may not trigger the RAT reselection network operation as there is no other option to reselect. However, when the OPLMN table 260 indicates that more than one RAT for a roaming network is available, the RAT detection engine 245 may continue use of the mechanisms according to the exemplary embodiments. Specifically, the RAT detection engine 245 may also identify the RAT on the roaming network that the UE 115 is currently using. Using conventional priorities of RATs (e.g., LTE having a higher priority than 3G which has a higher priority than 2G), the identification of a currently used RAT may indicate that the RAT selection network operation is to be used. For example, when connected using the LTE RAT, the RAT selection network operation may not be used as the highest priority RAT is already being used. In another example, when connected using the 3G RAT, the RAT selection network operation may be used as a higher priority RAT is available. Whether a conventional approach for these network operations is to be used or the mechanisms according to the exemplary embodiments are to be used may be determined based on further considerations.

In a fourth consideration, the output of the state engine 250 may indicate whether the use state of the UE 115 is in an active use state or a non-active use state (e.g., an idle state). As noted above, the active use state may relate to a user actively using the UE 115 along with the network connection. The non-active use state may relate to a user not using the UE 115 or, alternatively, using the UE 115 without the network connection. It is again noted that background use of the network connection may still place the UE 115 in the non-active state. The state engine 250 determining that the UE 115 is in the non-active use state may indicate that the conventional approach for the network and RAT reselection network operations is to be used. The state engine 250 determining that the UE 115 is in the active use state may indicate that the mechanisms according to the exemplary embodiments are to be used.

When the mechanism according to the exemplary embodiments is to be used, the selection engine 255 may set the manner in which the network and RAT reselection network operations are to be performed. In a first example, the selection engine 255 may retain a connection to the lower priority roaming network (e.g., the LPPLMN 110). In an exemplary manner of achieving this feature, the selection engine 255 may deactivate or suspend a scan timer associated with scanning for the HPPLMN 105. By deactivating or suspending the scan timer, the PLMN detection engine 240 may not detect the HPPLMN 105 despite the UE 115 being in position C where the HPPLMN 105 is available. In a second example, the selection engine 255 may deactivate a scan operation or a network reselection operation. Thus, when the scan timer expires, a scan may not be performed to detect the availability of the HPPLMN 105. Even if the HPPLMN 105 were detected, the network reselection operation being deactivated may prevent a connection to the HPPLMN 105 from being established, thereby retaining the connection to the LPPLMN 110. It should be noted that the above noted manners of retaining the connection to the LPPLMN 110 is only exemplary. Those skilled in the art will understand that there may be other ways in which to effectively retain a connection to the LPPLMN 110. Accordingly, the selection engine 255 may be configured to generally deactivate a capability for the UE 115 to connect to the HPPLMN 105.

It is noted that the deactivation of the scan timer or the scan for the HPPLMN 105 may not be triggered when unrelated events occur. For example, under conventional mechanisms, a SIB read failure, a radio link failure, a handover failure, etc., the UE 115 may be configured to perform a scan for the HPPLMN 105. However, using the mechanisms according to the exemplary embodiments, the scan for the HPPLMN 105 may be deactivated.

Under the mechanisms according to the exemplary embodiments, the retaining of the connection to the LPPLMN 110 may be maintained until an event is registered. The exemplary embodiments may utilize a variety of events that may trigger a termination of the mechanisms according to the exemplary embodiments so that the scan timer is allowed to run, the scan is allowed to be performed, and/or the network reselection operation is allowed to be performed. Thus, the trigger events may apply to scenarios in which the mechanism according to the exemplary embodiments is in use.

As noted above, the combination of factors may include being in the roaming state, having more than one foreign carrier as per the roaming agreement, being connected to a low priority roaming network, being connected to a high priority RAT, and the UE 115 being in an active use state. Thus, in a first example of the trigger event, a change in the use state may terminate use of the mechanism according to the exemplary embodiments and revert to a conventional approach to the network and RAT reselection network operations. Specifically, when the active use state is no longer detected and the UE 115 is in the non-active use state (e.g., the UE 115 is no longer being used by the user or the UE 115 is no longer using the network connection), the conventional approach may be used. In a second example of the trigger event, a change in the current connected LPPLMN 110 RAT from the high priority RAT (e.g., LTE) to a low priority RAT (e.g., 3G) may terminate use of the mechanisms according to the exemplary embodiments and revert to a conventional approach to the network and RAT reselection network operations. The exemplary embodiments may utilize other trigger events to terminate use of the mechanisms according to the exemplary embodiments. For example, a timer may be started upon the conditions satisfying the requirements for using the mechanisms according to the exemplary embodiments. Upon expiry of the timer, even if the conditions still satisfy the requirements for using the mechanisms according to the exemplary embodiments, the mechanisms may still be terminated.

By utilizing the mechanisms according to the exemplary embodiments, the above noted scenario of users being negatively impacted by network and RAT reselection network operations being performed as a priority under conventional approaches may be prevented. In this manner, a better user experience may be provided by staying in the same roaming network while the user is actively using the UE 115 and the network connection. The user may also not notice any frequent drops to a lower priority RAT or instances of lost service when using the UE 115 since these occasions occur while the UE 115 is in a non-active use state with regard to the network connection. Furthermore, while using the mechanism according to the exemplary embodiments, with less use of the scan timer, the scan operation, and/or the network reselection network operation, the power supply of the battery may be used less, thereby improving power usage.

Figure 3:
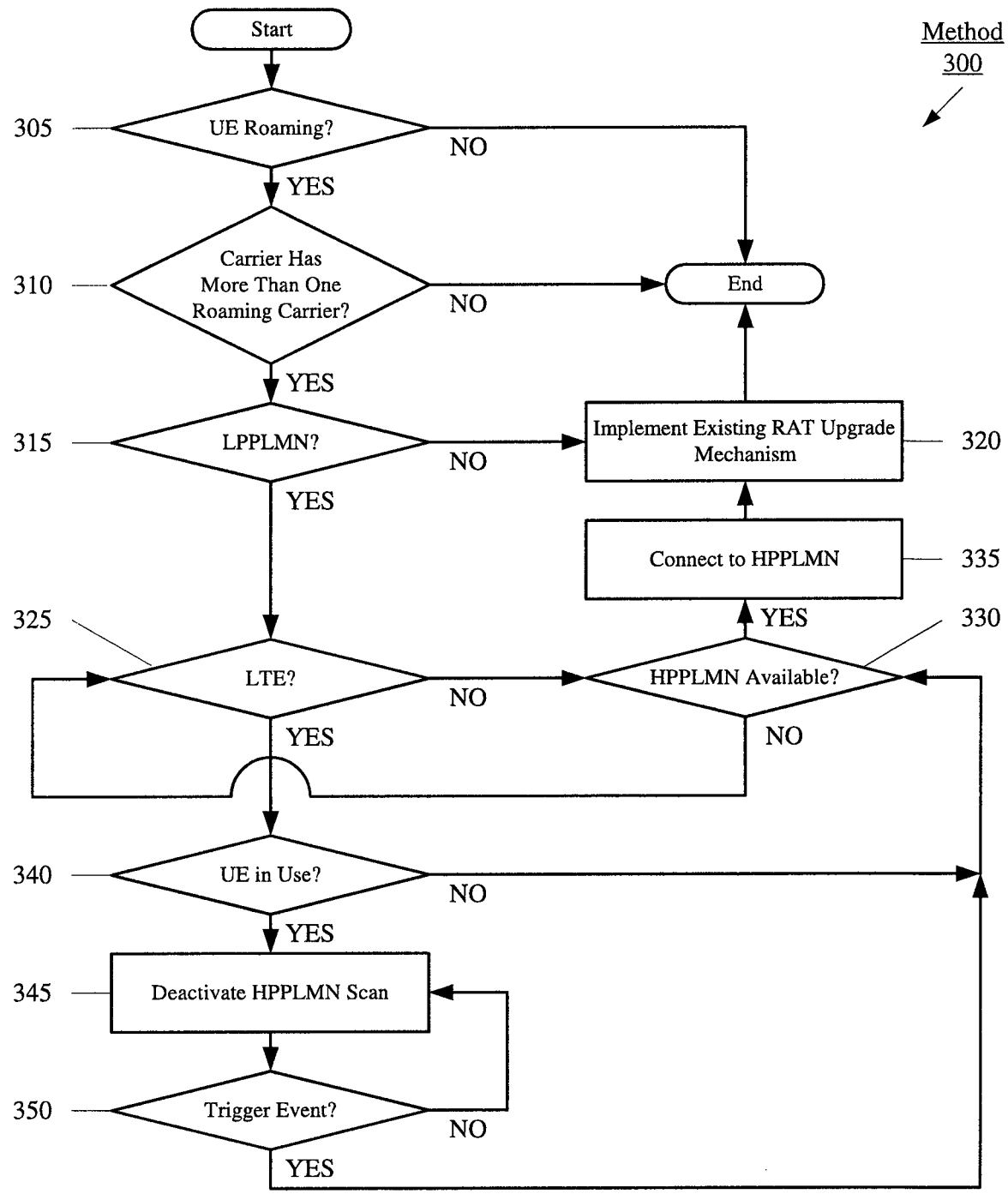
FIG. 3 shows an exemplary method for retaining a roaming network connection according to various exemplary embodiments described herein.

FIG. 3 shows an exemplary method 300 for retaining a roaming network connection according to various exemplary embodiments described herein. The method 300 may relate to when the UE 115 is in a foreign country and in a roaming state with a capability to connect to one or more roaming networks in the foreign country. The method 300 also addresses scenarios of modifying network operations associated with selecting a roaming network and a RAT of the selected network based on current conditions and states of the UE 115. The method 300 may be performed by the roaming engine 235, the PLMN detection engine 240, the RAT detection engine 245, the state engine 250, the selection engine 255, and/or other components of the UE 115. The method 300 will be described with regard to the system 100 of FIG. 1 and the UE 115 of FIG. 2.

In 305, the UE 115 determines between a roaming state and a non-roaming state. For example, the roaming engine 235 may utilize any information (e.g., location) to determine whether the home network is available. When the home network is available and the UE 115 is in a non-roaming state, the mechanism according to the exemplary embodiments may be inapplicable. However, when the home network is unavailable and the UE 115 is in a roaming state, the UE 115 continues to 310.

In 310, the UE 115 determines whether the carrier to which the user of the UE 115 is subscribed has a roaming agreement with more than one foreign carrier while roaming at the location of the UE 115. As noted above, the OPLMN table 260 may indicate the foreign carriers with which a roaming agreement exists. When the home carrier has no roaming agreement with any foreign carrier, the UE 115 may not establish a roaming network connection and the mechanisms according to the exemplary embodiments may be inapplicable. When the carrier has a roaming agreement with only one foreign carrier, the mechanisms according to the exemplary embodiments may again be inapplicable. With regard to the RAT reselection network operation, a conventional approach may be used in which higher priority RATs are used when available (e.g., reselecting to LTE when currently using 3G). When the carrier has a roaming agreement with two or more foreign carriers, the UE 115 may continue to 315.

In 315, the UE 115 determines whether a current roaming network connection is to a lower priority roaming PLMN (e.g., the LPPLMN 110). As noted above, the roaming agreement may be with two foreign carriers that provide the HPPLMN 105 and the LPPLMN 110. The OPLMN 260 may indicate a priority among the different available roaming networks. For example, the HPPLMN 105 may have a higher priority than the LPPLMN 110. Thus, the UE 115 may determine whether a connection to the higher priority roaming network is established. If the UE 115 is currently connected to the HPPLMN 105, the UE 115 continues to 320. In 320, the UE 115 implements an existing RAT upgrade mechanism. That is, the UE 115 may utilize a conventional approach to performing RAT reselection network operations. Thus, when using a lower priority RAT, a higher priority RAT may be reselected.

Returning to 315, if the UE 115 is currently connected to the LPPLMN 110, the UE continues to 325. In 325, the UE 115 determines whether the RAT that is currently being used is a high priority RAT. Based on conventional priorities, a RAT hierarchy may comprise the LTE RAT followed by 3G RAT. If the UE 115 is currently using a lower priority RAT such as 3G, the UE 115 continues to 330.

In 330, the UE 115 determines whether the HPPLMN 105 is available. At this stage of the method 300, the UE 115 may have determined that the UE 115 is in the roaming state, that more than one foreign carrier is available, that the UE 115 is connected to the LPPLMN 110, and that the UE 115 is using the 3G RAT. As conventional approaches to the network reselection network operations are to be used, the UE 115 may utilize a scan timer to perform a scan for the HPPLMN 105. When the HPPLMN 105 is detected, the UE 115 may continue to 335 where a connection to the HPPLMN 105 is established. Accordingly, a handover procedure may be performed from the LPPLMN 110 to the HPPLMN 105. Thereafter, a conventional approach to perform the RAT reselection network operations may be performed in 320. When the HPPLMN 105 is not detected, the UE 115 returns to 325.

If the UE 115 is currently using a higher priority RAT such as LTE, the UE continues from 325 to 340. In 340, the UE 115 determines a use state. For example, the state engine 250 determines between an active use state and a non-active use state. As noted above, there may be various degrees of use of the UE 115. For illustrative purposes, the use state may be with regard to whether the network connection is actively being used. Thus, the active use state may be, for example, when the user is using an application that utilizes the network connection. The non-active use state may be, for example, when the user is not using the UE 115 or using an application that does not utilize the network connection. When the UE 115 is in the non-active use state, the UE 115 continues to 330. However, if the UE 115 is in the active use state, the UE 115 continues to 345.

In 345, the UE 115 utilizes the mechanism according to the exemplary embodiments such that the UE 115 retains a network connection to the LPPLMN 110. Thus, while the UE 115 is in a roaming state, has more than one foreign carrier that is available, is connected to the LPPLMN 110, is using the LTE RAT, and is in the active use state, the current connection may be maintained until a trigger event occurs. The method 300 illustrates one manner of enabling this feature by deactivating the scan for the HPPLMN 105. In another exemplary embodiment, the method 300 may enable this feature by stopping the scan timer for the HPPLMN 105 or deactivating the network reselection network operation.

In 350, the UE 115 determines whether a trigger event has occurred. For example, the trigger event may be the UE 115 changing its use state from the active use state to the non-active use state. In another example, the trigger event may be the UE 115 changing its RAT from a high priority RAT to a low priority RAT. When the trigger event has not occurred, the features provided by the mechanism according to the exemplary embodiments are continued. That is, the scan for the HPPLMN 105, the scan timer for the HPPLMN 105, or the network reselection network operation may be deactivated. However, if the trigger event has occurred, the UE 115 continues to 330 so that a conventional approach to performing the network and RAT reselection network operations may be performed.

The exemplary embodiments provide a device, system, and method of retaining a current network connection while roaming when conditions and states of the UE indicate the use of such a feature. When a user is actively using the UE, the UE is connected to a roaming network having a lower priority, and the UE is using a high priority RAT, the mechanism according to the exemplary embodiments may prevent a network reselection network operation from occurring such that the network connection is maintained while the user is using the UE. In this manner, the network connection is not interrupted and a throughput is generally preserved. While the UE is using a low priority RAT or when the user is not actively using the UE, the retention of the current network connection may be terminated and conventional approaches to network and RAT reselection network operations may be performed.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:

1. A method, comprising:
    at a device that is configured to establish a first roaming network connection to a first roaming network and a second roaming network connection to a second roaming network, the first roaming network having a higher priority than the second roaming network, the second roaming network configured to support a first radio access technology (RAT) and a second RAT, the first RAT having a higher priority than the second RAT:
    when a current network connection is the second roaming network connection, determining a current RAT used for the second roaming network connection;
    when the current RAT is the first RAT, determining between an active use state and a non-active use state; and
    when the device is in the active use state, deactivating a capability to reselect to the first roaming network having the higher priority than the second roaming network to retain the current network connection to the second roaming network.

2. The method of claim 1, further comprising:
    determining available roaming networks at a location of the device, the available roaming networks based on an operator table, the operator table indicating a prioritization of the available roaming networks.

3. The method of claim 1, wherein the active use state comprises one of a display device of the device being activated, an input/output device of the device being used, the current network connection being in a connected state, or a combination thereof.

4. The method of claim 1, wherein the non-active use state comprises when the current network connection is in an idle state.

5. The method of claim 1, wherein the deactivating the capability to reselect the first roaming network comprises one of deactivating a scan timer to trigger a scan for the first roaming network, deactivating the scan for the first roaming network, deactivating a reselection operation to reselect to the first roaming network, or a combination thereof.

6. The method of claim 1, wherein the deactivating the capability to reselect the first roaming network persists when one of a system information block (SIB) read failure occurs, a radio link failure (RLF) occurs, a handover failure occurs, or a combination thereof.

7. The method of claim 1, further comprising:
    determining whether a trigger event has occurred; and
    when the trigger event has occurred, terminating the deactivating the capability to reselect the first roaming network.

8. The method of claim 7, wherein the trigger event comprises one of a change in the current RAT from the first RAT to the second RAT, a change from the active use state to the non-active use state, or a combination thereof.

9. The method of claim 1, wherein the device is associated with a home network provided by a home carrier, the home carrier having a roaming agreement with a first foreign carrier providing the first roaming network and a second foreign carrier providing the second roaming network.

10. The method of claim 1, wherein the first and second roaming networks are Public Land Mobile Networks (PLMNs), wherein the first RAT is a Long Term Evolution (LTE) RAT, and wherein the second RAT is a 3G RAT.

11. A device, comprising:
    a transceiver configured to establish a first roaming network connection to a first roaming network and a second roaming network connection to a second roaming network, the first roaming network having a higher priority than the second roaming network, the second roaming network configured to support a first radio access technology (RAT) and a second RAT, the first RAT having a higher priority than the second RAT; and
    a processor, when a current network connection is the second roaming network connection, determining a current RAT used for the second roaming network connection, when the current RAT is the first RAT, the processor determining between an active use state and a non-active use state, when the device is in the active use state, the processor deactivating a capability to reselect to the first roaming network having the higher priority than the second roaming network to retain the current network connection to the second roaming network.

12. The device of claim 11, further comprising:
    a memory arrangement storing an operator table, the operator table indicating available roaming networks at a location of the device, the operator table further indicating a prioritization of the available roaming networks.

13. The device of claim 12, wherein the memory arrangement includes a subscriber identity module (SIM) card.

14. The device of claim 11, wherein the active use state comprises one of a display device of the device being activated, an input/output device of the device being used, the current network connection being in a connected state, or a combination thereof.

15. The device of claim 11, wherein the non-active use state comprises when the current network connection is in an idle state.

16. The device of claim 11, wherein the processor deactivates the capability to reselect the first roaming network by one of deactivating a scan timer to trigger a scan for the first roaming network, deactivating the scan for the first roaming network, deactivating a reselection operation to reselect to the first roaming network, or a combination thereof.

17. The device of claim 11, wherein the processor further determines whether a trigger event has occurred and, when the trigger event has occurred, terminates the deactivating the capability to reselect the first roaming network.

18. The device of claim 17, wherein the trigger event comprises one of a change in the current RAT from the first RAT to the second RAT, a change from the active use state to the non-active use state, or a combination thereof.

19. The device of claim 11, wherein the device is associated with a home network provided by a home carrier, the home carrier having a roaming agreement with a first foreign carrier providing the first roaming network and a second foreign carrier providing the second roaming network.

20. An integrated circuit, comprising:
at a device that is configured to establish a first roaming network connection to a first roaming network and a second roaming network connection to a second roaming network, the first roaming network having a higher priority than the second roaming network, the second roaming network configured to support a first radio access technology (RAT) and a second RAT, the first RAT having a higher priority than the second RAT:
first circuitry configured to, when a current network connection is the second roaming network connection, determine a current RAT used for the second roaming network connection;
second circuitry configured to, when the current RAT is the first RAT, determine between an active use state and a non-active use state; and
third circuitry configured to, when the device is in the active use state, deactivate a capability to reselect to the first roaming network having the higher priority than the second roaming network to retain the current network connection to the second roaming network.

21. The integrated circuit of claim 20, further comprising:
fourth circuitry configured to determine available roaming networks at a location of the device, the available roaming networks based on an operator table, the operator table indicating a prioritization of the available roaming networks.

22. The integrated circuit of claim 20, wherein the active use state comprises one of a display device of the device being activated, an input/output device of the device being used, the current network connection being in a connected state, or a combination thereof.

23. The integrated circuit of claim 20, wherein the non-active use state comprises when the current network connection is in an idle state.

24. The integrated circuit of claim 20, further comprising:
fourth circuitry configured to determine whether a trigger event has occurred; and
when the trigger event has occurred, fifth circuitry to terminate the deactivating the capability to reselect the first roaming network.

* * * * *